(12) United States Patent
Chang et al.

(10) Patent No.: US 8,057,673 B2
(45) Date of Patent: Nov. 15, 2011

(54) SYSTEM AND METHOD FOR TREATING WASTEWATER CONTAINING AMMONIA

(75) Inventors: Kuan-Foo Chang, Changhua County (TW); Sheng-Hsin Chang, Miaoli County (TW); Shwu-Huey Perng, Hsinchu County (TW)

(73) Assignee: Industrial Technology Research Institute, Hsinchu County (TW)

( * ) Notice: Subject to any disclaimer, the term of this patent is extended or adjusted under 35 U.S.C. 154(b) by 335 days.

(21) Appl. No.: 12/474,262

(22) Filed: May 28, 2009

(65) Prior Publication Data
US 2010/0133179 A1  Jun. 3, 2010

(30) Foreign Application Priority Data

Dec. 2, 2008 (TW) .............................. 97146733 A (51) Int. Cl.
*C02F 3/00* (2006.01)
(52) U.S. Cl. ........ 210/605; 210/615; 210/616; 210/621; 210/622; 210/623; 210/626; 210/630; 210/743; 210/194; 210/196; 210/197
(58) Field of Classification Search .......... 210/615–616, 210/620, 630, 605, 623, 626, 743, 194–197, 210/621–622, 739
See application file for complete search history.

(56) References Cited

U.S. PATENT DOCUMENTS

| | | | |
|---|---|---|---|
| 4,820,415 A * | 4/1989 | Reischl | 210/616 |
| 5,078,884 A | 1/1992 | Mulder | |
| 5,972,220 A * | 10/1999 | Bailey | 210/605 |
| 6,383,390 B1 | 5/2002 | Van Loosdrecht et al. | |
| 6,485,646 B1 | 11/2002 | Dijkman et al. | |
| 7,510,655 B2 * | 3/2009 | Barnes | 210/605 |
| 7,722,769 B2 * | 5/2010 | Jordan et al. | 210/616 |
| 2010/0072131 A1 * | 3/2010 | Nick et al. | 210/605 |
| 2010/0140167 A1 * | 6/2010 | Sun et al. | 210/605 |

FOREIGN PATENT DOCUMENTS

CN  101302059 A  11/2008

OTHER PUBLICATIONS

First Office Action issued by the China Intellectual Property Office on Feb. 24, 2011, for the referenced application's counterpart application in China (Appl. No. 200810187347.6).
Guo et al., "Effects of DO and pH on nitrosofication and half-nitrosofication", Techniques and Equipment for Environmental Pollution Control, vol. 7, No. 1, pp. 37-40,63 (2006).

* cited by examiner

*Primary Examiner* — Chester Barry
(74) *Attorney, Agent, or Firm* — Pai Patent & Trademark Law Firm; Chao-Chang David Pai (57) ABSTRACT

Treatment system for wastewater containing ammonium is provided. The treatment system of the present invention includes an ammonia oxidation reactor and a membrane reactor disposed on the back of the ammonia oxidation reactor. The ammonia oxidation reactor includes biological carriers for carrying the ammonium oxidation bacteria and nitrite oxidation bacteria, a pH level controller for increasing the pH level to above 7.5, and a DO (dissolved oxygen) controller for reducing the DO content to less than 1.0 mg/L. The membrane reactor composed of a membrane and an aerator is used to separate the solids and liquids of the effluent of the ammonia oxidation reactor. In addition, a method for treating wastewater containing ammonium is also provided.

16 Claims, 7 Drawing Sheets

SYSTEM AND METHOD FOR TREATING WASTEWATER CONTAINING AMMONIA

CROSS REFERENCE TO RELATED APPLICATIONS

This Application claims priority of Taiwan Patent Application No. 097146733, filed on Dec. 2, 2008, the entirety of which is incorporated by reference herein.

BACKGROUND OF THE INVENTION

1. Field of the Invention

The present invention relates to environmental engineering, and in particular relates to a system for treating wastewater containing ammonia.

2. Description of the Related Art

Either city or industry wastewater treatment, removing the ammonia is an important factor. The nitrogen exists in the form of ammonium and/or organic nitrogen in the city wastewater and the organic is usually converted to ammonium under an aerobic or anaerobic treatment. In the conversional denitrification process, ammonium is oxidized to become nitrate by bacteria occurs during aerobic condigion, and then the nitrate is reduced to become nigrogen gas and returned to the atmosphere.

In the conversional biological process, ammonium is firstly oxidized by the ammonium oxidation bacteria (AOB) to become nitrite, the nitrite is sequentially oxidized by the nitrite oxidation bacteria (NOB) to become nitrate, and then nitrate is reduced by denitrifying bacteria to become nitrogen gas. Since the high aeration volume and addition of organic materials are required to convert the ammonium to nitrate and provide a carbon source in the conversional treatment, not only excess energy is consumed but also the footprint of aeration unit is large to complete nitrification.

To mitigate the previously mentioned problems, an anammox process is developed. In the anammox process, nitrite which acts as electron acceptor and subsequently combines with ammonium, which also results in the production of nitrogen gas. Before the anaerobic oxidation process, ammoinium shall be converted to nitrite to provide enough electron acceptors. However, because nitrite is a transitional material in the nitrification process, nitrite concentration usually is low and not enough. Thus, the amount of nitrite shall be increased to improve the ammonium oxidation process.

BRIEF SUMMARY OF THE INVENTION

The invention provides a system for treating wastewater containing ammonia, comprising: an ammonia oxidation reactor, comprising biological carriers for carrying ammonium oxidation bacteria and nitrite oxidation bacteria, a pH level controller for increasing a pH level of the ammonia oxidation reactor to more than 7.5, a dissolved oxygen (DO) controller for reducing the DO content of the ammonia oxidation reactor to less than 1.0 mg/L, and a membrane reactor disposed on the back of the ammonia oxidation reactor, wherein the membrane reactor comprises a membrane and an air aerator for separating the solids and liquids of the effluent of the ammonia oxidation reactor.

The invention further provides a method for treating wastewater containing ammonia, comprising: providing an ammonia oxidation reactor, comprising ammonium oxidation bacteria and nitrite oxidation bacteria; increasing a pH level of the ammonia oxidation reactor to more than 7.5 and decreasing a DO content of the ammonia oxidation reactor to less than 1.0 mg/L to reactivate the ammonium oxidation bacteria and inactivate the nitrite oxidation bacteria; conducting wastewater containing ammonia into the ammonia oxidation reactor for converting ammonium to nitrite rather than nitrate, and conducting effluent of the ammonia oxidation reactor into a membrane reactor to separate the solids and liquids of the effluent of the ammonia oxidation reactor.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
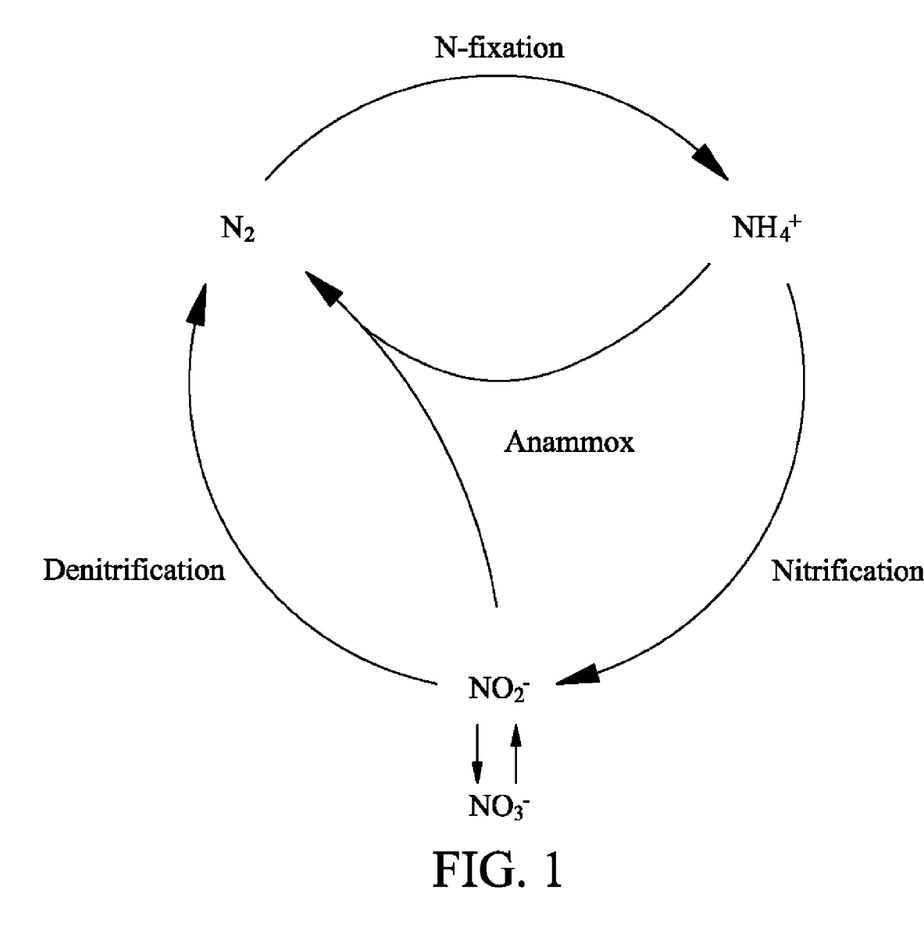
FIG. 1 shows circulation of nitrogen in nature.

Referring to FIG. 1, in nature, ammonium ion ($NH_4^+$) can be converted to nitrite ion ($NO_2^-$) by ammonium oxidation bacteria, and then the nitrite ion can be converted to nitrate ion ($NO_3^-$) by nitrite oxidation bacteria The conversion is called "nitrification". During anaerobic (low oxygen) conditions, nitrite can be combined with ammonium in the anammox process to produce nitrogen gas. However, nitrite is a transitional material in the nitrification process, which is easily converted to nitrate ($NO_3^-$).

In the wastewater treatment system of the invention, nitrite is a main product of the ammonia oxidation reactor, by control of the pH level and dissolved oxygen (DO) content of the wastewater.

Figure 2:
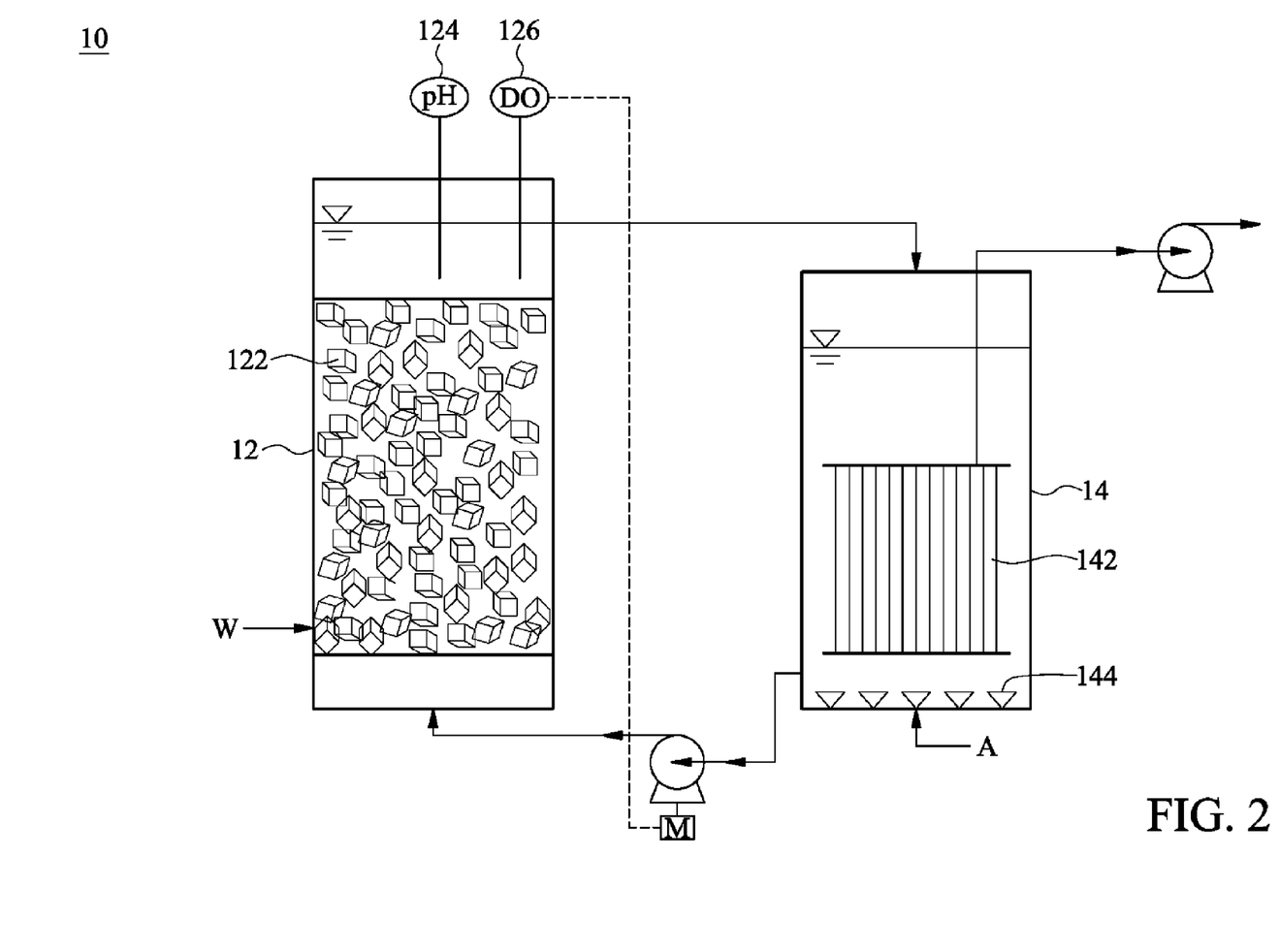
FIG. 2 shows a wastewater treatment system according to an embodiment of the invention.
Figure 3:
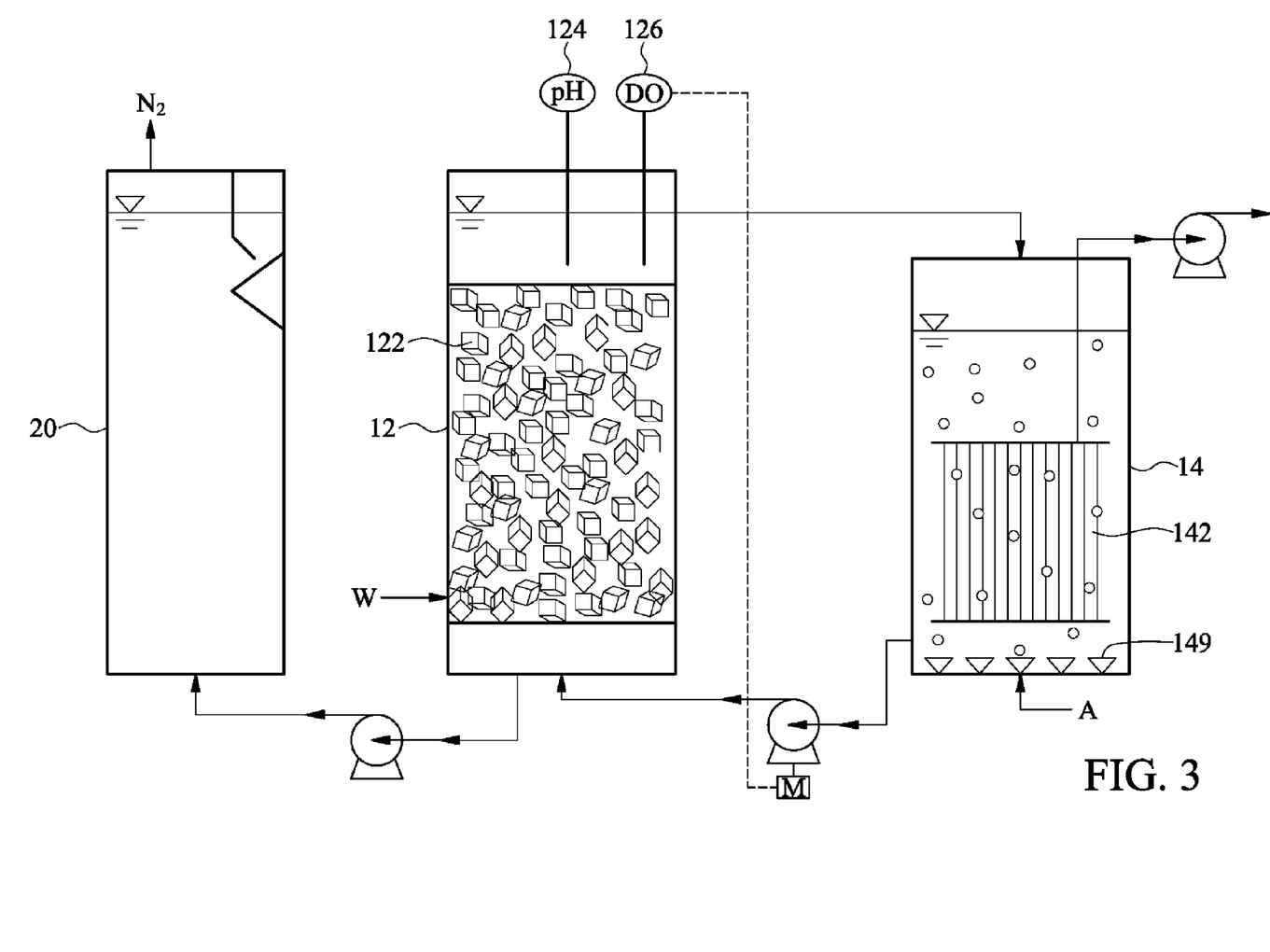
FIG. 3 shows a wastewater treatment system of the invention series connected with an anammox reactor.
Figure 4:
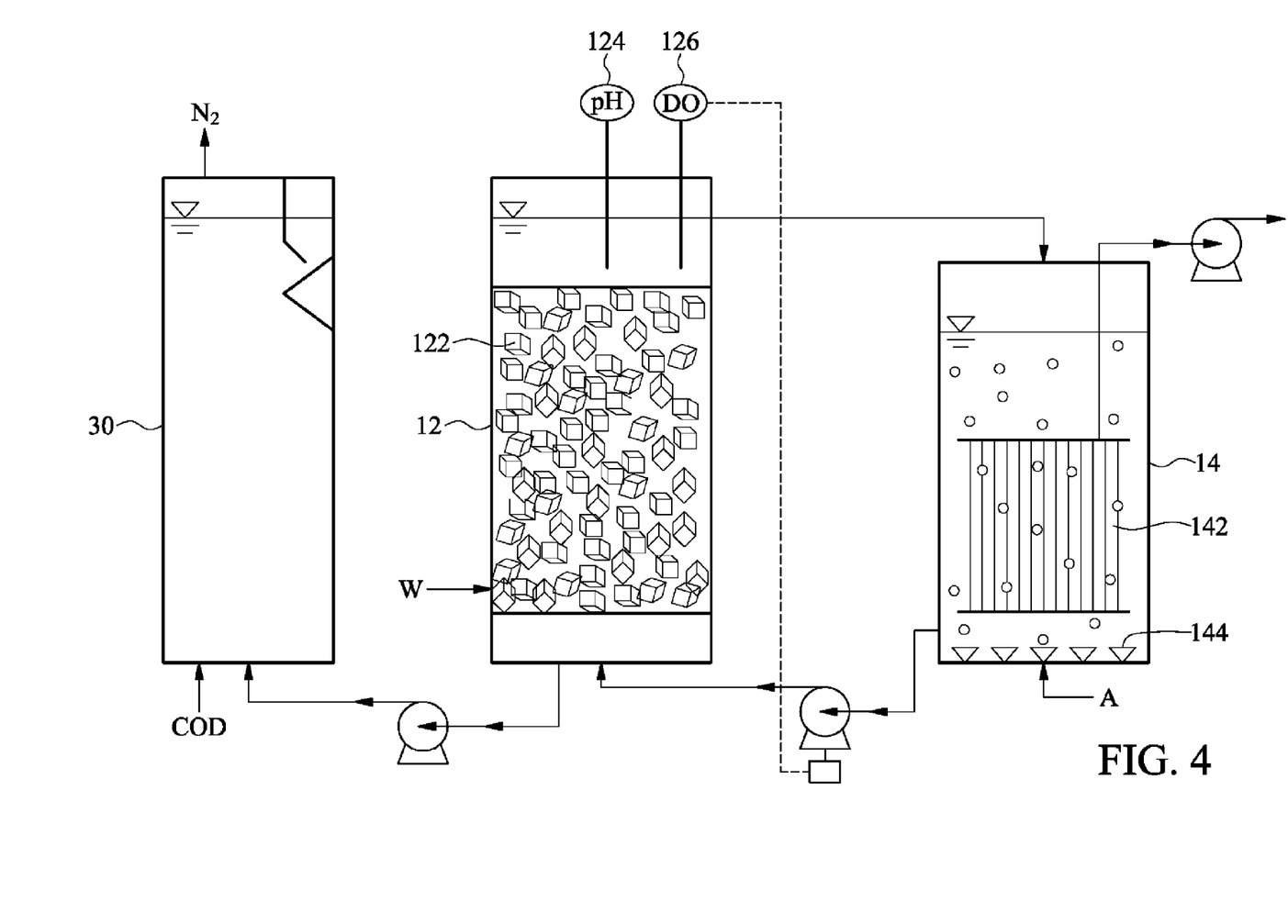
FIG. 4 shows a wastewater treatment system of the invention series connected with a denitrifying reactor.

FIGS. 2 to 4 illustrate embodiments of a wastewater treatment system according to the invention. It should be understood that the drawings herein are made in simplicity, and are utilized for illustrating associated elements related to the invention. In practical usage however, the wastewater treatment system is more complexly structured.

Referring to FIG. 2, the wastewater treatment system 10 of the invention includes an ammonia oxidation reactor 12 and a membrane reactor 14 disposed on the back of the ammonia oxidation reactor 12. Firstly, ammonia-based wastewater W is conducted into the ammonia oxidation reactor 12, and then the effluent of the ammonia oxidation reactor 12 is conducted into a membrane reactor 14. The oxygen rich mixed liquor of the membrane reactor 14 is recycled back to ammonia oxidation reactor 12 to provide dissolved oxygen concentration which is controlled less than 1.0 mg/L.

The treatment system of the invention is suitable for ammonia-based wastewater from sources, such as, a semiconductor factory, or a digester for waste sludge digestion. Preferably, the ammonium concentration for wastewater is more than 100 mg-N/L. If the wastewater contains organic nitrogen, an anaerobic process is required to convert the organic nitrogen to ammonium and subsequently conduct the converted ammonium into the wasterwater treatment system of the invention.

The ammonia oxidation reactor 12 includes a plurality of carriers 122 carrying the ammonium oxidation bacteria (AOB) and nitrite oxidation bacteria (NOB). The carriers 122 can store the microorganism, e.g., ammonium oxidation bacteria, to increase the amount of microorganism. Carriers 122 can be any kinds of carriers. For example, foam carriers or nonwoven carriers may be utilized. The examples of the kinds of ammonium oxidation bacteria (AOB) and nitrite oxidation bacteria (NOB) are shown in Table 1.

TABLE 1

| Nitrifying bacteria | Species | | Classification |
|---|---|---|---|
| Ammonium oxidation bacteria (AOB) | Nitrosomonas | europaea eutrophus marina | β-Proteobacteria |
| | Nitrosococcus | nitrosus mobilis oceanus | β-Proteobacteria |
| | Nitrosospira | briensis | β-Proteobacteria |
| | Nitrosolobus | multiformis | β-Proteobacteria |
| | Nitrosovibrio | tenuis | β-Proteobacteria |
| Nitrite oxidation bacteria (NOB) | Nitrobacter | winogradskyi hamburgensis vulgaris | α-Proteobacteria |
| | Nitrospina | gracilis | δ-Proteobacteria |
| | Nitrococcus | mobilis | γ-Proteobacteria |
| | Nitrospira | marina | Nitrospira group |

Additionally, the ammonia oxidation reactor 12 further includes a pH controller 124 and a DO content controller 126. In one embodiment of the invention, the pH controller 124 includes a pH meter and an alkaline solution (e.g., NaOH) or acid solution. The pH meter can detect the pH level for wastewater in the ammonia oxidation reactor 12, and adjust the pH level for wastewater in the ammonia oxidation reactor 12 to above 7.5, such as pH 7.5-8.2. In another embodiment, the DO content controller 126 can control the reflux ratio of wastewater, which is conducted back into the ammonium oxide reactor 12, to control the DO content to less than 1.0 mg/L, such as, 0.5-0.8 mg/L.

It is noted that the condition of the ammonia oxidation reactor 12 is suitable for the growth of the ammonium oxidation bacteria, and suppresses the growth of the nitrite oxidation bacteria. Thus, the dominant bacteria in the ammonia oxidation reactor 12 is ammonium oxidation bacteria.

The membrane reactor 14 of the invention includes a membrane 142 and an air aerator 144. The membrane 142 can separate the solids and liquids of the effluent of the ammonia oxidation reactor 12 to improve the quality of the effluent. One skilled in the art will select an appropriate membrane 142 depending on the source for wastewater. Examples of a membrane 142 include, but are not limited to, a hollow fiber membrane, a flat sheet membrane, or a ceramic membrane. The air aerator 144 can pump air A into the membrane reactor 14 to clean the surface of the membrane 142 and provide dissolved oxygen for the ammonia oxidation reactor 12. In another embodiment, the membrane reactor 14 can also be deposited in the ammonia oxidation reactor 12 (not shown).

In the treatment system 10 of the invention, the ammonium oxidation bacteria can effectively convert ammonium to nitrite, and the conversion rate is more than 80%. Additionally, the nitrite oxidation bacteria are inactivated so that it is difficult for nitrite to be converted in the treatment system 10.

Compared with the conventional nitrification reaction process, the wastewater treatment system of the invention can reduce energy demand by above 50%, because aeration and conversion of nitrate from ammonium is not required.

Referring to FIG. 3, the wastewater treatment system 10 can be series connected with an anammox reactor 20. The ammonia-based wastewater W is conducted into the ammonia oxidation reactor 12, and then the effluent of the ammonia oxidation reactor 12 is conducted into the membrane reactor 14 and anammox reactor 20. The effluent of the membrane reactor 14 and anammox reactor 20 can be conducted back into the ammonia oxidation reactor 12. In the anammox reactor 20, nitrite and ammonium are combined with in the anammox process resulting in the production of nitrogen gas.

Referring to FIG. 4, in another embodiment of the invention, the wastewater treatment system 10 can be series connected with a denitrifying reactor 30. The ammonia-based wastewater W is conducted into ammonia oxidation reactor 12, and then the effluent of the ammonia oxidation reactor 12 is conducted into the membrane reactor 14 and denitrifying reactor 30. The effluent of the membrane reactor 14 and denitrifying reactor 30 can be conducted into the ammonia oxidation reactor 12. In the denitrifying reactor 30, nitrite is converted to nitrogen gas in the denitrification process (as shown in FIG. 1). Further, a carbon source COD can be added to the denitrifying reactor 30 depending on actual requirement.

Figure 5:
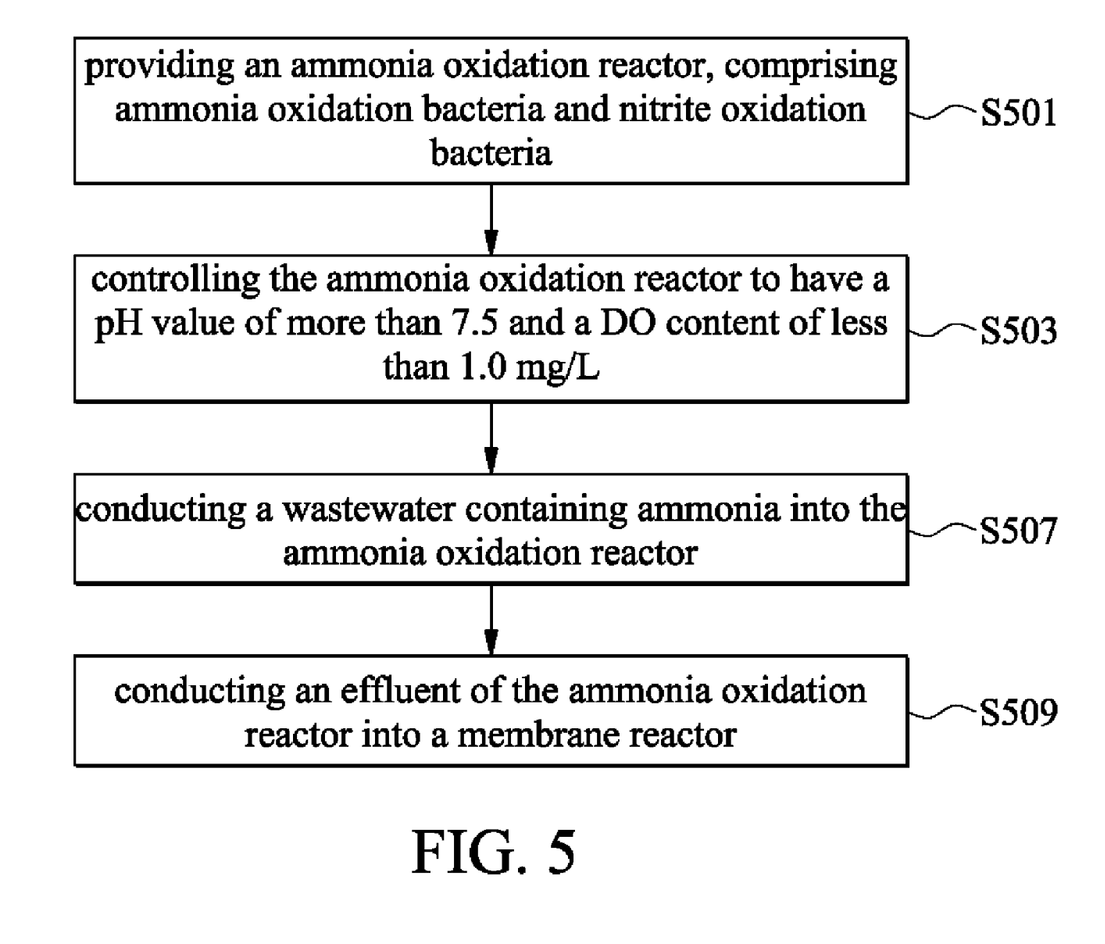
FIG. 5 shows a method for treating ammonia-based wastewater according to an embodiment of the invention.

The invention further provides a method for treating wastewater containing ammonia as shown in FIG. 5. Referring to S501, an ammonia oxidation reactor is provided, wherein the ammonia oxidation reactor contains the ammonium oxidation bacteria (AOB) and nitrite oxidation bacteria (NOB). The ammonia oxidation reactor can include carriers for carrying the ammonium oxidation bacteria and nitrite oxidation bacteria.

Referring to S503, in the ammonia oxidation reactor, the pH level is controlled to more than 7.5, such as 7.5-8.2, and the DO content is controlled to less than 1.0 mg/L, such as, 0.5-0.8 mg/L. In this condition, the ammonium oxidation bacterium is reactivated and the nitrite oxidation bacterium is inactivated.

Referring to S507, wastewater is conducted into the ammonia oxidation reactor to convert the ammonium to nitrite and nitrate, and the nitrite concentration is higher than nitrate concentration in the ammonia oxidation reactor.

Referring to S509, the effluent of the ammonia oxidation reactor is conducted into the membrane reactor to separate the solids and liquids of the effluent.

The effluent of the ammonia oxidation reactor can also be conducted into an anammox reactor or denitrifying reactor to convert the nitrite to nitrogen gas in an anammox process or denitrification process.

In the method of the invention, ammonium can be effectively converted to nitrite, and the conversion rate is more than 80%.

EXAMPLE

Example 1

Treatment of Ammonia-Based Wastewater by the System of the Invention

The wastewater treatment system shown in FIG. 2 was used in Example 1. The wastewater treatment system included 4 liters of the ammonia oxidation reactor 12 and a membrane reactor 14. The ammonia oxidation reactor 12 included PU foam carriers for carrying the ammonium oxidation bacteria and nitrite oxidation bacteria. The membrane rector 14 included hollow fiber membranes.

In the ammonia oxidation reactor 12, the pH level was 7.9 and the DO content was 0.8 mg/L.

The wastewater containing 200 mg/L ammonium nitrogen ($NH_4$—N) was conducted into the ammonia oxidation reactor 12 and membrane reactor 14, wherein the flow rate was 8 ml/min, hydraulic retention time was 1 day, and total nitrogen was 0.29 kg $NH_3$—$N/m^3$-d.

Figure 6:
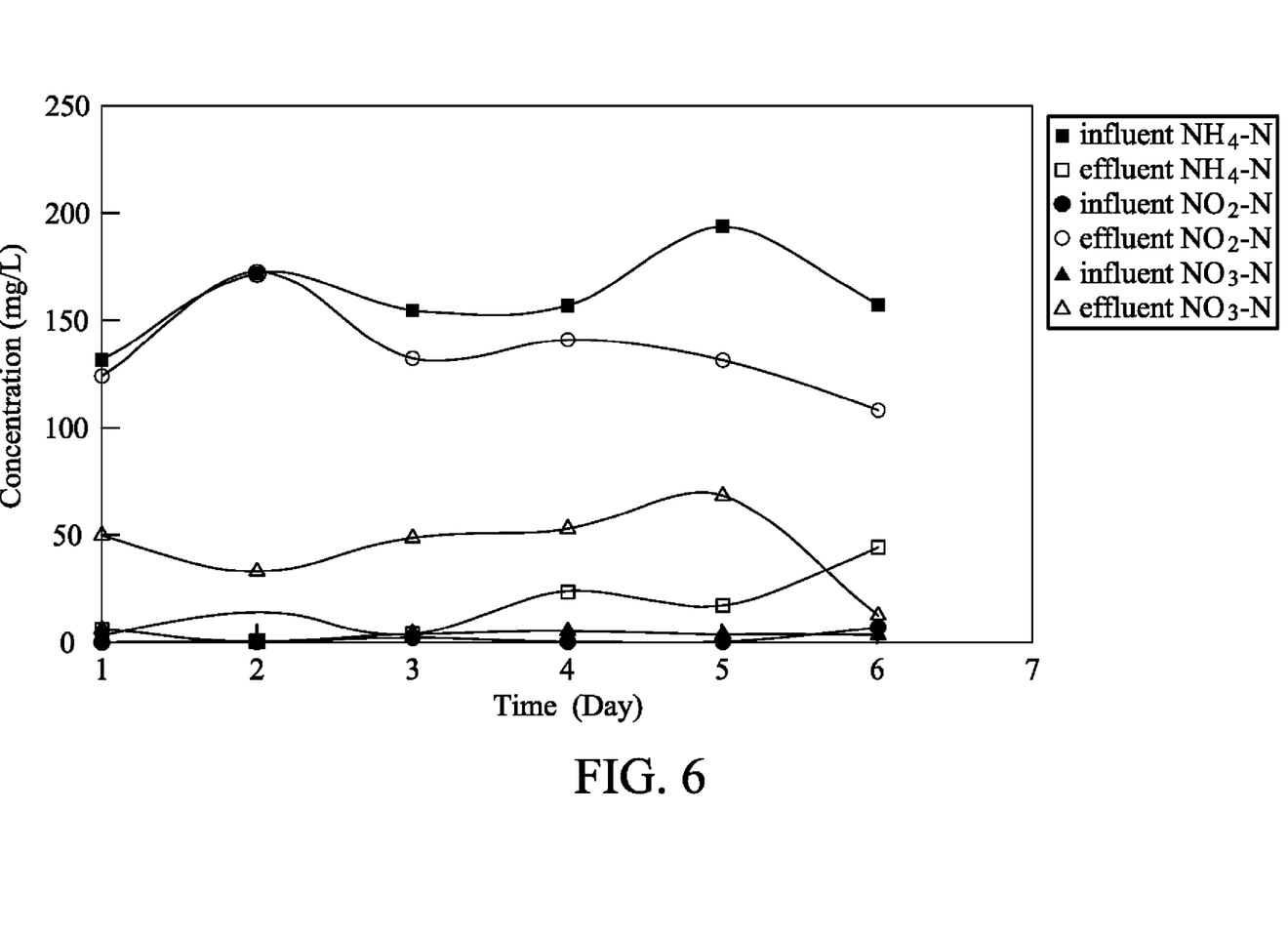
FIG. 6 shows the concentration of ammonium, nitrate, and nitrate in the effluent or influent solution from reactors after treatment of the method of the invention.

FIG. 6 illustrates the concentration of ammonium, nitrate, and nitrite in the influent and effluent solution from rectors. Referring to FIG. 6, the concentration of ammonium nitrogen ($NH_4$—N) in the influent was 150-200 mg/L. After treatment, the concentration of nitrite nitrogen ($NO_2$—N) and nitrate nitrogen ($NO_3$—N) in the effluent were 134.8 mg/L and 43.9 mg/L, respectively. The results indicated that the wastewater treatment system of the invention can effectively convert ammonium to nitrite, with the conversion rate about 80%, and nitrite being the main product in the ammonia oxidation reactor 12.

Comparative Example 1

The treatment system in Example 1 was used except that the pH level and DO content were not controlled. After treatment, the concentration of ammonium nitrogen ($NH_4$—N), nitrite nitrogen ($NO_2$—N), and nitrate nitrogen ($NO_3$—N) in the influent and effluent solution from rectors was measured, the results are shown in FIG. 7.

Figure 7:
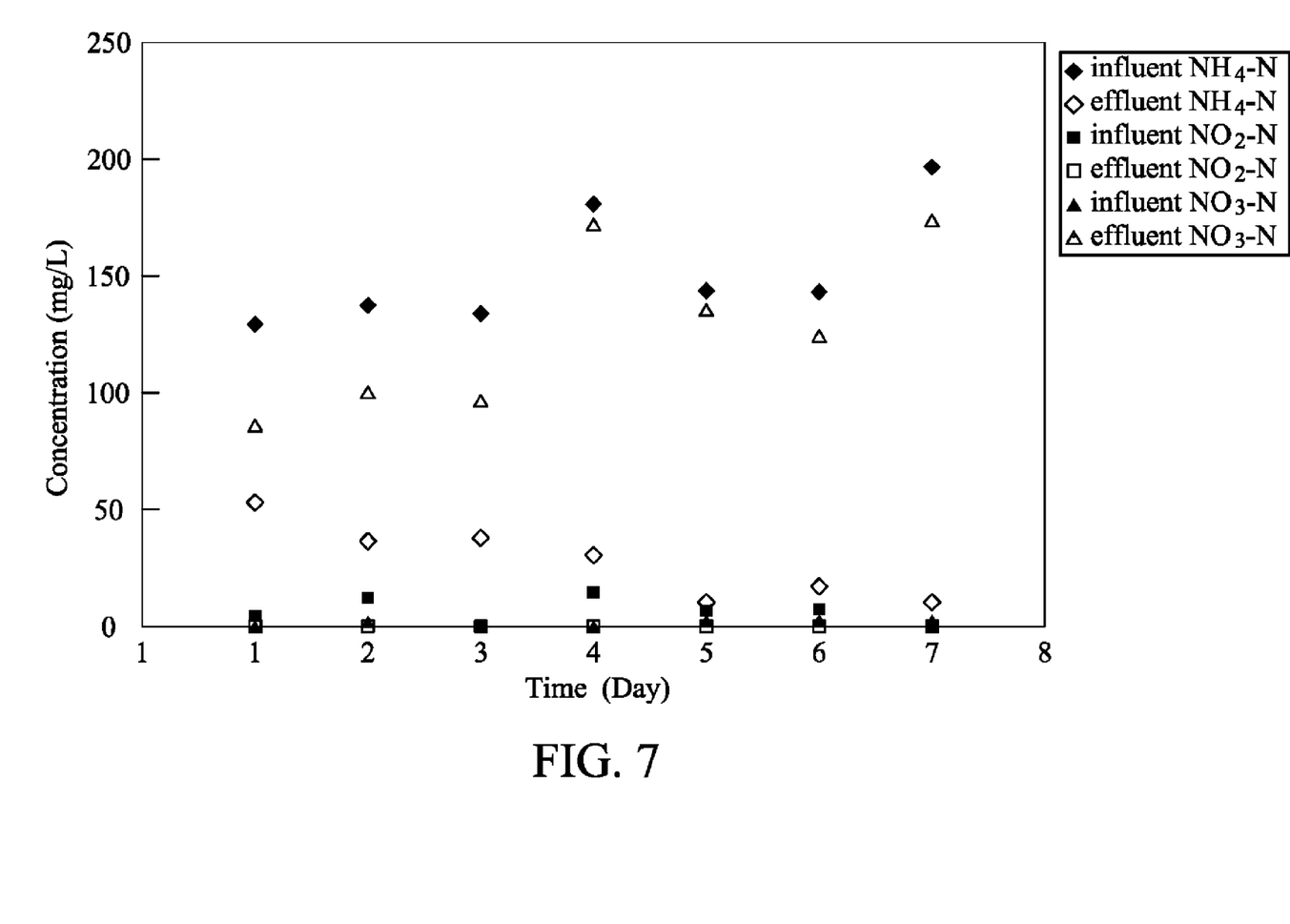
FIG. 7 shows that only a little ammonium is converted to nitrite in the conventional method.

Referring to FIG. 7, the ammonium in the wastewater was mostly converted to nitrate, and only a little ammonium was converted to nitrite. In contrast, the conversion rate was only 1%.

Thus, the results indicated that the wastewater treatment system of the invention can effectively convert ammonium to nitrite to mitigate the problems associated with the prior art.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A system for treating wastewater containing ammonia, comprising:
    an ammonia oxidation reactor, comprising biological carriers for carrying ammonium oxidation bacteria and nitrite oxidation bacteria, a pH level controller for increasing the pH level of the ammonia oxidation reactor to more than 7.5, and a dissolved oxygen (DO) controller for reducing the DO content of the ammonia oxidation reactor to less than 1.0 mg/L, and
    a membrane reactor disposed downstream of the ammonia oxidation reactor, wherein the membrane reactor comprises a membrane and an air aerator for separating solids and liquids in an effluent of the ammonia oxidation reactor and yielding an oxygen rich liquid effluent,
    wherein the DO controller controls the DO content of the ammonia oxidation reactor by controlling a reflux ratio of the oxygen rich liquid effluent that is conducted back to the ammonia oxidation reactor.

2. The system as claimed in claim 1, wherein the ammonia oxidation reactor has a pH level of about 7.5 to 8.2.

3. The system as claimed in claim 1, wherein the ammonia oxidation reactor has a DO content of about 0.5 to 1.0 mg/L.

4. The system as claimed in claim 1, wherein the ammonium oxidation bacteria are reactivated in the ammonia oxidation reactor.

5. The system as claimed in claim 1, wherein the nitrite oxidation bacteria are inactivated in the ammonia oxidation reactor.

6. The system as claimed in claim 1, wherein nitrite has a higher concentration than nitrate in the ammonia oxidation reactor.

7. The system as claimed in claim 1, wherein the membrane comprises a hollow fiber membrane, a flat sheet membrane, or a ceramic membrane.

8. The system as claimed in claim 1, wherein the carrier comprises a foam carrier or a nonwoven carrier.

9. The system as claimed in claim 1, further comprising an anammox reactor in series with the ammonia oxidation reactor.

10. The system as claimed in claim 1, further comprising a denitrifying reactor in series with the ammonia oxidation reactor.

11. A method for treating wastewater containing ammonia, comprising
    providing an ammonia oxidation reactor, comprising ammonium oxidation bacteria and nitrite oxidation bacteria;
    increasing the pH level of the ammonia oxidation reactor to more than 7.5 and decreasing the DO content of the ammonia oxidation reactor to less than 1.0 mg/L to reactivate the ammonium oxidation bacteria and inactivate the nitrite oxidation bacteria;
    conducting wastewater containing ammonia into the ammonia oxidation reactor for converting ammonium to nitrite and yielding an effluent, and
    conducting the effluent of the ammonia oxidation reactor into a membrane reactor to separate solids and liquids of the effluent of the ammonia oxidation reactor and yield an oxygen rich liquid effluent,
    wherein the DO content of the ammonia oxidation reactor is controlled by controlling a reflux ratio of the oxygen rich liquid effluent that is conducted back to the ammonia oxidation reactor.

12. The method as claimed in claim 11, wherein the ammonia oxidation reactor has a pH level of about 7.5 to 8.2.

13. The method as claimed in claim 11, wherein the ammonia oxidation reactor has a DO content of about 0.5 to 1.0 mg/L.

14. The method as claimed in claim 11, wherein the effluent passing through the membrane reactor is conducted back into the ammonia oxidation reactor.

15. The method as claimed in claim 11, wherein the wastewater is treated with an anammox process or a denitrifying process before the wastewater is conducted into the ammonia oxidation reactor.

16. The method as claimed in claim 11, further aerating the wastewater in the membrane reactor.

* * * * *